United States Patent [19]

Scotti

[11] Patent Number: 5,116,242

[45] Date of Patent: May 26, 1992

[54] SHIM FOR ELECTRICAL DEVICE

[76] Inventor: Joseph F. Scotti, 5329 Talley Green Dr., Marietta, Ga. 30068

[21] Appl. No.: 699,365

[22] Filed: May 13, 1991

[51] Int. Cl.⁵ .............................................. H01R 13/00
[52] U.S. Cl. ...................................... 439/538; 411/522
[58] Field of Search ............... 439/538, 539, 845, 849, 439/850, 860; 411/522, 539

[56] References Cited

U.S. PATENT DOCUMENTS

| 911,032 | 2/1909 | Dow | 439/860 |
|---|---|---|---|
| 3,645,709 | 3/1976 | Filson | 439/860 |
| 3,689,864 | 9/1972 | Glader | 439/538 |
| 4,948,317 | 8/1990 | Marinaro | 439/539 |

FOREIGN PATENT DOCUMENTS

| 1014836 | 12/1965 | United Kingdom | 439/860 |
|---|---|---|---|
| 1166130 | 10/1969 | United Kingdom | 439/850 |

*Primary Examiner*—Joseph H. McGlynn
*Attorney, Agent, or Firm*—James B. Middleton

[57] ABSTRACT

A shim is easily insertable between an electrical device and the box in which the device is to be mounted. The shim has a hole in the center to receive the device mounting screw, and a channel to allow the shim to be slipped over the screw without removing the screw. The channel includes a constriction so that shim will snap over the screw and not be easily removed. A handle extends from the shim for easy manipulation, the handle including knurls for a better grip.

7 Claims, 1 Drawing Sheet

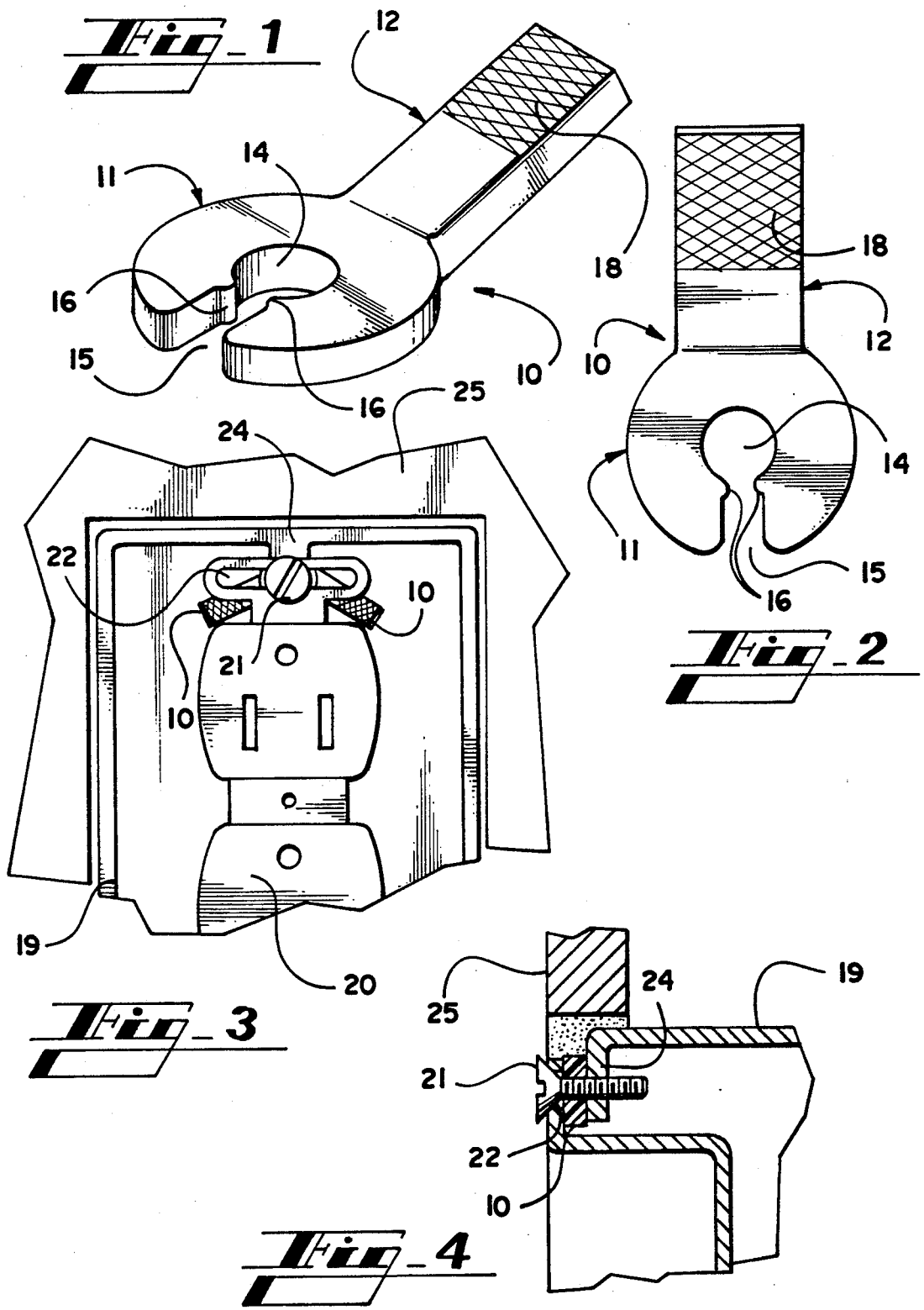

SHIM FOR ELECTRICAL DEVICE

INFORMATION DISCLOSURE STATEMENT

The use of shims is well known generally, a shim being virtually any thin member to fill up space and create a tight fit. Though the general principal is known, and much used, there are numerous instances wherein a shim is not the obvious solution to a problem. The usual reason not to use a shim is the difficulty in creating shim to fit the intended location and to function properly in the specific environment.

One application that has long been in need of some form of shim, or spacer, is in the mounting of electrical devices within conventional boxes. It will be understood that switches, convenience outlets and the like are generally intended to be mounted flush with the wall surface but are also intended to be mounted rigidly with respect to the box. If the box is not precisely located with respect to the wall surface, the electrical device may not be properly mounted.

The conventional prior art solution to the mounting of an electrical device in an improperly placed box is to utilize a plurality of conventional steel washers. The washers are simply placed around the mounting screws between the box and the electrical device. While such an arrangement can be effective, such a system can require numerous trials with complete removal of the screw each time, in order to use the proper number of washers. Another prior art effort at solving the problem is disclosed in U.S. Pat. No. 4,948,317 issued to Marinaro. The Marinaro device comprises a formed metal sleeve that is disposed between the electrical device and the box, the sleeve being somewhat crushable to allow adjustment. One embodiment of the device comprises a shim that is bent at an acute angle and having a keyhole slot therein so the shim can be slipped over a screw without removing the screw entirely. This device relies on the elasticity of metal for stable mounting of the electrical device and would be very difficult to use if more than one shim is required.

Thus, the prior art does not provide a truly convenient and effective shim for use in mounting electrical devices in improperly placed electrical boxes.

SUMMARY OF THE INVENTION

This invention relates generally to spacers and the like, and is more particularly concerned with an easily installable and removable shim for use in mounting electrical devices in boxes.

The present invention provides a shim having an open slot to allow the shim to be placed over a screw and removed from the screw without removing the screw from the threaded hole. Means are provided on the shim to cause the shim to snap over the screw, so the shim is retained on the screw until forcibly removed therefrom.

The shim of the present invention further includes handle means extending from the shim for easy manipulation of the shim. In the preferred embodiment of the invention, the handle means is angled with respect to the shim in order to dispose the handle conveniently for manipulation of the shim.

BRIEF DESCRIPTION OF THE DRAWINGS

These and other features and advantages of the present invention will become apparent from consideration of the following specification when taken in conjunction with the accompanying drawings in which:

FIG. 1 is a perspective view of a shim made in accordance with the present invention;

FIG. 2 is a top plan view of the shim shown in FIG. 1 of the drawings;

FIG. 3 is a fragmentary view showing an electrical device mounted in a box and having two of the shims of the present invention in conjunction therewith; and, FIG. 4 is a fragmentary cross-sectional view showing a shim made in accordance with the present invention surrounding a mounting screw for an electrical device.

DETAILED DESCRIPTION OF THE EMBODIMENT

Referring now more particularly to the drawings and that embodiment of the invention here presented by way of illustration, FIG. 1 shows a shim generally designated at 10, and including a body designated at 11 and a handle 12. It will be noted that the handle 12 is integrally formed with the body 11, and extends upwardly therefrom, angularly related to the body 11.

Attention is directed to FIGS. 1 and 2 of the drawings, FIG. 2 showing the body 11 in plan view, so the body 11 is in its true shape. The body 11 comprises a generally cylindrical member having a central opening 14, the opening 14 being connected to the periphery of the body 11 through a channel 15. Between the channel 15 and the opening 14, it will be seen that there are ridges designated at 16, the ridges 16 effectively constricting the passage 15 for entry into the opening 14.

Those skilled in the art will understand that, when the shim 10 is to be passed over a screw, the screw will pass reasonably easily through the channel 15, and the screw will fit reasonably easily within the opening 14; however, the ridges 16 constrict the passage 15 sufficiently that the screw will not easily pass through the constriction created. Thus, the body 11 will somewhat snap over the screw, greater force being required to cause the ridges 16 to pass over the screw.

Generally at the periphery of the body 11, the body is rounded at the entrance to the channel 15. This provides a funnel effect so the shim 10 can be easily placed over a screw without requiring careful alignment of the body 11 and the channel 15 with the screw.

The handle 12 is provided to allow easy manipulation of the shim 10. While the handle 12 may be disposed at an desired angle, for the environment here contemplated it is preferred that the handle 12 extend generally radially from the body 11, and upwardly therefrom. An angle of approximately 20° has been found to be satisfactory, though this may vary depending on the particular devices to be mounted, and the particular boxes in which they are mounted.

To assist in manipulation of the shim 10, it will be noted that the extending ends of the handle 12 are provided with ridges 18. The extending end of the handle 12 is therefore knurled on at least one side, and perhaps on both sides, to allow a better grip for both inserting and removing the shim 10.

Looking at FIG. 3 of the drawings, it will be seen that there is a conventional switch box designated at 19, the box 19 having a convenience outlet 20 mounted therein. As is conventional, there is a mounting screw 21 passing through a slot 22 to secure the outlet 20 to tab 24 of the box 19. Surrounding the box 19 is wall board 25.

Those skilled in the art will understand that the usual convenience outlet 20 is provided with removable tabs referred to as plaster ears. These plaster ears extend from the end of the outlet 20, the idea being for the ears to rest on the wall board 25 to support the outlet 20 in the event the box 19 is not properly placed with respect to the surface of the wall. Frequently, the wall board 25 is simply not close enough to the outlet 20 for plaster ears to be seated on the wall board. Even when the plaster ears are seated on the wall board, it will be understood that the ears are removable and are therefore not strong enough to withstand significant force. As a result, a firm pushing of a plug into the outlet 20 can cause the plaster ears to bend, allowing the outlet 20 to be pushed further into the box 19 and usually causing the plastic face plate to be broken.

In accordance with the present invention, there are two shims 10 surrounding the mounting screw 21. With the above description in mind, it will be understood that one can grasp a shim 10 by the handle 12 and simply push the shim onto the screw 21. The screw will easily enter the channel 15; then, with extra force to pass the ridges 16, the screw can enter the opening 14. The shim 10 is then firmly in place and significant force will be required to remove the shim. A plurality of the shims can be stacked, one upon the other, until the required thickness is obtained. If too many shims are installed, one or more of the shims can easily be removed by pulling on the extending handle 12. Finally, the screw 21 can be tightened firmly to hold the outlet 20 against the tab 24 for the box 19.

Preferably, the shims 10 of the present invention will be colored brightly to be easily located. Wires are commonly colored red, green, black and white, so a different color is contemplated. One might choose yellow, though of course any other color may serve. A different shade of another color can be used to distinguish the shims from wires or other apparatus.

FIG. 4 of the drawings is a cross-sectional view showing the shim 10 between the outlet 20 and the tab 24 of the box 19. In FIG. 4, only one shim 10 is shown, but it will be readily recognized that, if the wall 25 were differently placed, additional shims 10 could be installed on the screw 21 to adjust the position of the outlet 20.

Those skilled in the art will understand that switches and other electrical devices are mounted in switch boxes, or round boxes or square boxes in the same manner as described. Thus, the use of the shim is not limited to the specific arrangement here shown.

Those skilled in the art will understand that electrical devices and boxes for receiving them are standardized so that, currently, a shim made in accordance with the present invention might also be standardized. Thus, by way of example, the shim of the present invention might have a body 11 with a diameter of 15/32 of an inch, and an opening 14 with a diameter of about 9/64 of an inch. The handle 12 might be about a half inch long and extending at an angle of 20° from the body 11. The shim can be made in numerous thicknesses, and may be supplied in a single thickness or perhaps in two or more different thicknesses to allow one to make up the total shim thickness desired It is contemplated that the shim might be provided in a single thickness of about 3/32 of an inch for general convenience in supply and use.

Also, the shim of the present invention might be made of any of numerous materials. Obviously, several different metals might be used, though plastic would tend to be more economical and easier to use without concern for the problems that arise from dissimilar metals. One plastic that is contemplated as an appropriate material is "NORYL" made by General Electric. "NORYL" is a polyphenyleneoxide, and is available with and without glass filler. The material has a rating of SE-1 so it does not constitute a fire hazard. Nevertheless, numerous other materials can be used to make shims in accordance with the present invention.

It will therefore be understood by those skilled in the art that the particular embodiment of the invention here presented is by way of illustration only, and is meant to be in no way restrictive; therefore, numerous changes and modifications may be made and the full use of equivalents resorted to, without departing from the spirit or scope of the invention as outlined in the appended claims.

I claim:

1. In the combination comprising a box mounted within a wall adjacent to the surface of said wall, an electrical device received within the box to be mounted substantially flush with said surface of said wall, and a mounting screw extending through said electrical device and into said box, the improvement comprising at least one shim selectively receivable around said mounting screw between said electrical device and said box for spacing said electrical device from said box to locate said electrical device flush with said surface of said wall, said shim including a body defining an opening therein for receiving said screw, a channel connecting said opening with the periphery of said body for allowing said screw to enter said opening, and a handle extending from said body for manipulating said body.

2. In the combination as claimed in claim 1, the further improvement including at least one ridge in said channel for constricting said channel, the arrangement being such that additional force is required to cause said screw to enter said opening.

3. In the combination as claimed in claim 2, said body being generally cylindrical and having a plane upper surface, said handle extending angularly upwardly from said plane upper surface.

4. In the combination as claimed in claim 3, the improvement wherein the extending end of said handle is knurled.

5. In he combination as claimed in claim 4, said at least one shim comprising a plurality of shims for spacing said electrical device further from said box.

6. A shim to be received on a screw for maintaining spacing along said screw, said shim comprising a body and a handle extending therefrom, said body and said handle being integrally formed of an electrically insulating material, said body defining a central opening therethrough and a channel connecting said central opening with the periphery of said body, said central opening being adapted to receive said screw therein, said channel being sized to receive said screw therethrough, said body being generally cylindrical with a plane upper surface and a plane lower surface parallel to said upper surface, said central opening extending axially of said body, said channel extending along a radius of said body, and including at least one ridge for defining a constriction in said channel, said handle extending generally radially from said body and angling upwardly from said plane upper surface, the arrangement being such that said handle can be grasped for manipulation of said shim.

7. A shim as claimed in claim 6, and further including knurling on he extending end of said handle.

* * * * *